Aug. 11, 1953     M. O. QUALEN     2,648,374
APPARATUS TO REMOVE TIRES FROM RIMS BY VIBRATION
Filed June 5, 1947     2 Sheets-Sheet 1

INVENTOR.
Martin O. Qualen
BY
Robert M. Dunning

Aug. 11, 1953    M. O. QUALEN    2,648,374
APPARATUS TO REMOVE TIRES FROM RIMS BY VIBRATION
Filed June 5, 1947    2 Sheets-Sheet 2

INVENTOR.
Martin O. Qualen
BY Robert M. Dunning.

Patented Aug. 11, 1953

2,648,374

UNITED STATES PATENT OFFICE 2,648,374

APPARATUS TO REMOVE TIRES FROM RIMS BY VIBRATION

Martin O. Qualen, Iowa Falls, Iowa

Application June 5, 1947, Serial No. 752,770

9 Claims. (Cl. 157—1.1)

My invention relates to an improvement in vibration actuated tire removing apparatus wherein it is desired to provide a simple and efficient manner of removing tires from rims.

Heavy tires such as truck tires and the like are ordinarily mounted on rims which are channel shaped in cross section and which include a removable side. When it is necessary to remove a tire from the rim, it is usual practice to detach the removable channel side and to force the tire casing off this side of the rim. Various means have been provided for forcing the tire from the rim. Hammers are often used to pound the tire casing loose from the rim. Various hydraulic devices have been provided to engage against the casing and to force the tire therefrom. Many of these devices have a tendency to break the side walls of the casings. If the edges of the casing are firmly adhered to the rim as is often the case when the tire has been in place for a considerable period of time, the edges of the rim tend to remain adhered and the pressing force against the casing tends to distort the casing out of its normal shape. As a result the tire casings break down much more quickly than would otherwise be the case.

It is the object of the present invention to provide an apparatus capable of removing tire casings from their rims in a minimum of time and with a minimum of effort. This device is designed to remove the casing without any injury thereto and without bending the casing out of its normal shape. As a result the casings will not be injured during the tire changing process and will thus last longer than would otherwise be the case.

A feature of the present invention lies in the provision of an apparatus which will support the rim with the tire thereon on a generally vertical axis. The support is then vibrated by suitable means. This vibration tends to shake the casing lose from the rim and allow the casing to slide by its own weight off one side of the rim. As a result the shape of the casing is not changed during the tire removing process and the casing walls are not excessively distorted and injured.

An added feature of the present invention lies in the provision of a simple and effective means of holding tire rims of various shapes. My support is designed to allow easy attachment of a wheel of the disc type so that the tire can be removed therefrom by vibration. Similarly means are provided to support a wheel rim so that the tire casing may be removed therefrom.

An added feature of the present invention lies in the provision of a support for holding a wheel or rim in a horizontal position with the axis thereof extending generally vertical and to provide an air hammer or similar device in the standard which will act to vibrate the standard by successive blows. I have found that when the rim or wheel is thus vibrated the weight of the tire casing will cause the same to slide from the opening side thereof without injury to the casing.

These and other objects and novel features of my invention will be more clearly and fully set forth in the following specification and claims.

In the drawings forming a part of my specification:

Figure 1:
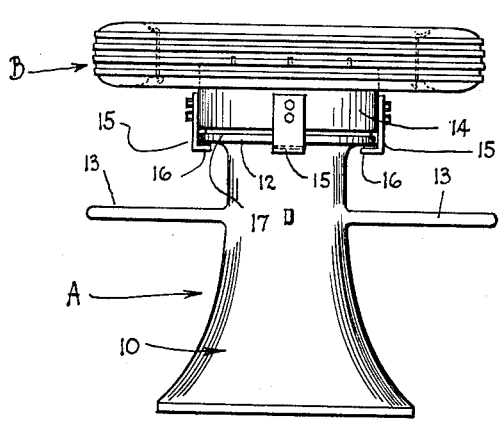
Figure 1 is a side elevational view of a tire changing device showing the construction thereof.
Figure 2:
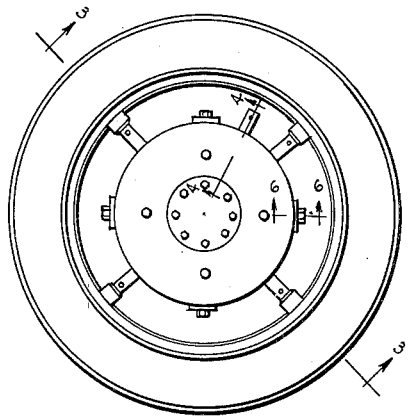
Figure 2 is a top plan view of the apparatus illustrated in Figure 1.

The tire changing apparatus A illustrated in the figures is of particular use in detaching tire casings B from disc wheels or from their rims. The apparatus is also useful in applying tires to their rims as will be later described in detail.

The device A includes a base frame or standard 10 which is relatively wide at its lower extremity 11 and which tapers inwardly to some extent above the base. A ring like peripheral flange 12 is provided on the body 10 at its upper extremity for a purpose which will be later described in detail. Horizontally extending spokes or arms 13 may extend outwardly from the standard 10 at a point spaced below the flange 12. These arms or spokes 13 are designed to support the tire casing after it drops free of its wheel or rim. If desired the spokes 13 may be replaced by a ring like flange or taper for greater strength and rigidity.

The base member 10 is hollow to enclose a part of the mechanism of my apparatus. A cylindrical head 14 is mounted upon the standard 10 and is held in place by clamps 15. The clamps 15 are preferably bolted to the head 14 and are provided with inturned flanges 16 which extend beneath the ring like flange 12 of the base 10 to hold the head in place thereupon. A ring like gasket 17 of cushioning material is interposed between the flange 12 and the head 14 so that all of the vibration of the head will not be transmitted to the standard 10.

A generally vertical cylinder 19 is attached to the head 14 and depends downwardly therefrom within the standard 10. A cylindrical end 20 is bolted to a peripheral flange 21 at the lower extremity of the cylinder 19. A piston 22 is freely slidable vertically in the cylinder 19 and possesses considerable weight. This piston 22 is designed to strike against the head 14 as it moves vertically to produce a sharp impact upon the head which tends to vibrate the same.

The cylindrical end 20 is provided with an air passage 23 therethrough which includes a vertical portion 24 extending upwardly into the cylinder 19 and includes a horizontal portion 25 which extends transversely of the cylinder end. The passage 23 is connected to a suitable air supply line 26 which in turn is connected to a suitable source of supply of compressed air or the like, not illustrated in the drawings.

Figure 5:
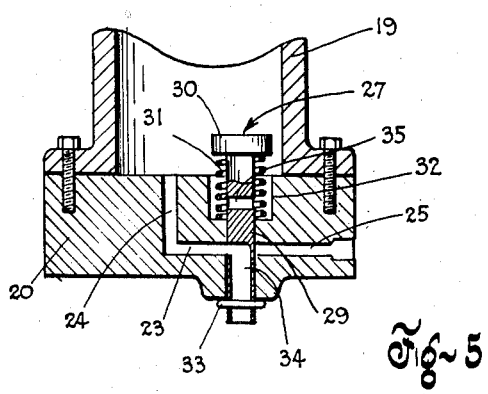
Figure 5 is a sectional view in the detail portion of my device.

A valve 27 best illustrated in Figure 5 of the drawings is interposed in the horizontal portion 25 of the passage 23. The valve 27 includes a valve rod 29 having a head 30 at its upper extremity which is urged upwardly by a spring 31. The spring 31 is interposed between the head 30 and the base of a circular groove 32 in the cylindrical end 20. A pin or shoulder 33 extends through the valve rod 29 to limit upward movement of this rod.

A passage 34 is provided through the valve rod 29 which is in communication with the portion of the passage 23 communicating with the interior of the cylinder 19 when the valve 27 is in its raised position illustrated in Figure 5 of the drawings. In this position of the valve 27 the air supply line 26 is disconnected from the portion of the passage 23 communicating with the interior of the cylinder and the inside of the cylinder 19 communicates with the outer atmosphere. The valve rod 29 is also provided with a second passage 35 therethrough which forms a connection between the air supply line 26 and the interior of the cylinder 19 when the valve 27 is in its lowered position. This passage 35 forms a connection between the portions of the passage 23 on opposite sides of the valve rod when the valve 27 is lowered. The valve 27 is lowered by the weight of the piston 22 resting upon the head 30 of the valve.

From the foregoing description it will be obvious that when the air supply 26 is connected to a suitable source, and the piston 22 is in its lowered position resting upon the head of the valve 27, air from the supply source can enter the cylinder 19 beneath the piston 22 and force this piston upwardly. As soon as the weight of the piston 22 is removed from the top of the valve 27, this valve will raise into the closed position shown in Figure 5 of the drawings and will connect the interior of the cylinder with the outer atmosphere. Thus the piston 22 may be blown upwardly at a high rate of speed by the air force and is free to drop downwardly in the cylinder as soon as it strikes the upper end of the cylinder. Obviously as soon as the piston 22 strikes the top of the valve 27, air will again enter below the piston forcing the same upwardly at a high rate of speed. Thus the device forms an air hammer which may be employed to impart vibration to the head 14.

While the arrangement of passages and the valve arrangement illustrated has been found desirable and advantageous, other constructions may be employed to serve a similar purpose. In other words, the principle of an air hammer of any common type may be employed in place of the particular construction shown. Furthermore, other means may be provided for vibrating the head 14, although certain of these means might not be as effective as the particular structure illustrated.

An air hose 36 may extend upwardly from the source of pressure supply to a passage 37 in the head 14. This passage 37 may lead to the interior of a chamber 39 within the head 14 and which is closed by a top closure plate 40 secured in place by bolts 41 or other suitable means. A series of radially extending cylinders 42 communicates with the chamber 39. Plungers 43 extend through axial apertures 44 in the head 14 in alignment with the various cylinders 42. Pistons 45 are provided on the ends of the plungers 43, and springs 46 are provided between the pistons 45 and the outer ends of the cylinders 42 to normally retract the plungers inwardly.

Grooved heads 47 are provided on the outer extremities of the plungers 43. These grooved heads 47 are designed to engage against the inwardly grooved edges 49 of the tire rim 50. When expanded in this manner the plungers support the rim 50 in proper relation to the head, the plungers moving outwardly in a radial direction from the common chamber 39.

Figure 4:
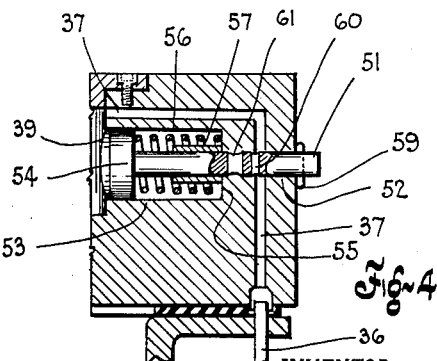
Figure 4 is an enlarged section showing a detail portion of the apparatus.

A control plunger 51 is also provided in the head 14. This plunger is best illustrated in Figure 4 of the drawings. The plunger 51 is radially slidable in an axial aperture 52 in the head 14. A relatively large diameter aperture 53, coaxial with the aperture 52, communicates with the chamber 39. The plunger 51 is provided with a piston 54 thereon slidably mounted in an aperture 53. A shoulder 55 is formed between the two different diameter apertures 52 and 53. A spring 56 is interposed between the shoulder 55 and the piston 54. A spacing sleeve 57 encircling the plunger 51 limits movement of the plunger 51 in one direction. A pin 59 through the plunger 51 limits movement of this plunger in the opposite direction.

The plunger 51 intersects the air inlet passage 37 to the chamber 39. A small opening 60 through the plunger 51 allows air to enter the chamber 39 slowly, forcing outwardly the plunger 51, as well as the rim supporting plungers 43. As the plunger 51 moves outwardly, the opening 60 moves out of registry with the passage 37 just after the larger opening 61 starts movement into registry therewith. When the plunger 51 moves sufficiently, the larger opening 61 allows full air pressure to enter the chamber 39, and thus allows the rim supporting plungers 43 to be held with full pressure.

The operation of my apparatus has been explained in connection with the construction of the device. The rim is placed about the top of the apparatus so that the grooved edge of the rim is lowermost and is outwardly from the piston clamping heads 47. Air is applied to the chamber 39 forcing these clamping heads outwardly in a radial direction against the rim, thus firmly supporting the rim. Air is next supplied to the interior of the cylinder 19 acting to reciprocate the piston 22 in this cylinder. This movement creates an action similar to that of an air hammer. The piston strikes against the head block 14 with a firm sharp blow and vibrates the head 14. This vibrating movement imparted to the head causes the tire casing B to shake free of the rim and to slide downwardly by gravity until it is entirely free of the rim. The rim may then be grasped and air pressure to the chamber 39 may be released, allowing the springs 46 to retract the plungers 43. The rim is then released and the tire may be removed from its position encircling the standard 10.

Figure 7:
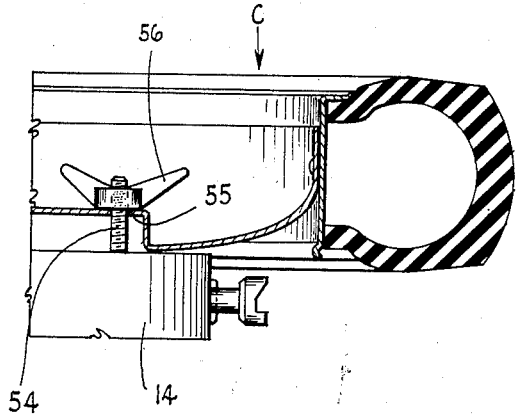
Figure 7 is a sectional view through a disc, wheel, and tire casing supported thereon showing the manner in which such disc wheels are supported.
Figure 6:
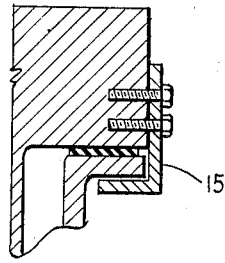
Figure 6 is a sectional view of another portion of my device showing the manner in which it is connected together.
Figure 3:
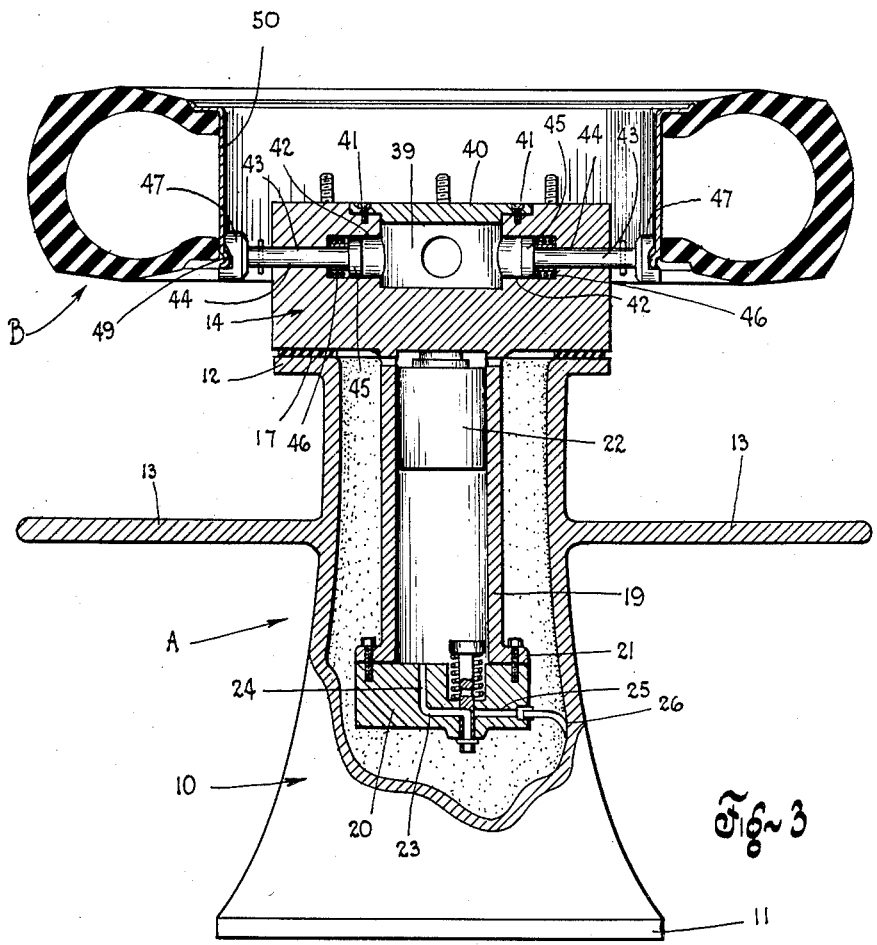
Figure 3 is a sectional view through the tire changing device illustrating the construction thereof.

In Figure 7 of the drawings I disclose the manner in which a disc wheel is supported. The head 14 is provided with a series of angularly spaced studs 54 extending upwardly therefrom. The disc wheel C is placed upon the top of the head 14 with the apertures 55 in the disc embracing the studs 54. Nuts 56 may be provided on the studs 54 to clamp the disc wheel C in place. In this arrangement the rim clamps are not employed and once the wheel is in position it is only necessary to start the piston 22 into operation to shake the casing free of the wheel.

While the particular arrangement illustrated is of decided advantage, it is possible to provide other means of vibrating the head 14 to shake the tire casing free of a rim supported thereupon. The air hammer which produces sharp blows against the head has been found particularly useful for this purpose.

In accordance with the patent statutes, I have described the principles of construction and operation of my tire changing apparatus, and while I have endeavored to set forth the best embodiment thereof, I desire to have it understood that obvious changes may be made within the scope of the following claims without departing from the spirit of my invention.

I claim:

1. A tire removing apparatus for removing a tire from a rim having a separable rim flange comprising a standard, a head supported thereby, said head having anvil means associated therewith, means carried by said head for gripping and holding a tire rim, a cylinder beneath said anvil means, piston means reciprocable in said cylinder, one end of said piston means extending outwardly of said cylinder and being disposed to strike said anvil means at the end of its upward stroke, and means for feeding fluid pressure beneath said piston means to successively elevate said piston means at relatively short spaced intervals to produce a series of upwardly propelled strokes of said piston means against said anvil means.

2. A tire removing apparatus for removing a tire from a rim having a separable rim flange which includes a support provided with means for gripping and holding a tire rim or wheel, and air hammer means associated with said support for shaking said support by means of substantially uniform blows.

3. A tire removing apparatus for removing a tire from a rim having a separable rim flange comprising a standard, a head resiliently supported by said standard, means on said head for gripping and holding a rim or wheel, and vibrating means carried by said standard and operable to vibrate said head at a substantially uniform rate.

4. A tire removing apparatus for removing a tire from a rim having a separable rim flange comprising a standard, a head resiliently supported by said standard, a cylinder supported by said head, a piston slidable in said cylinder and engageable with said head endwise, means for reciprocating said piston in said cylinder at a substantially uniform rate, and means on said head for supporting a tire rim or wheel on a generally vertical axis, whereby reciprocation of said piston will vibrate said head and said tire rim or wheel.

5. A tire removing apparatus for removing a tire from a rim having a separable rim flange comprising a standard, a head resiliently supported by said standard, a piston reciprocable against said head to vibrate the same, means for reciprocating said piston, and means on said head for mechanically gripping and holding a tire rim or wheel, whereby vibrations produced in said head will be transmitted to said tire rim or wheel via said last named means.

6. A tire removing apparatus for removing a tire from a rim having a separable rim flange comprising a standard, a head supported thereby, said head having an anvil portion associated therewith, a series of radially extending plungers slidably supported by said head, means for simultaneously forcing said plungers outwardly, resilient means for urging said plungers inwardly, and means for vibrating said head, said last named means including a member for delivering successive blows to said anvil portion.

7. A tire removing apparatus for removing a tire from a rim having a separable rim flange comprising a standard, a head supported thereby, said head including an anvil portion, a series of radially extending plungers supported by said head, means normally urging said plungers inwardly toward the center of said head, fluid means for forcing said plungers outwardly against a rim, and means for vibrating said head, said last named means including a member for delivering successive blows to said anvil portion.

8. An apparatus for removing tires relative to a rim having a separable rim flange which includes a standard, a support mounted upon said standard, means on said support for gripping and holding a tire rim to support the same, and impact actuated means associated with said support for vibrating said support at a substantially uniform rate.

9. A tire removing apparatus for removing a tire from a rim having a separable rim flange comprising means supporting said rim on a generally vertical axis, impact actuated means associated with said support for vibrating said support at a substantially uniform rate, and means for catching said tire as it falls from said rim.

MARTIN O. QUALEN.

References Cited in the file of this patent

UNITED STATES PATENTS

| Number | Name | Date |
|---|---|---|
| 560,354 | Hain | May 19, 1896 |
| 834,306 | Krause | Oct. 30, 1906 |
| 1,402,471 | Beck | Jan. 3, 1922 |
| 1,454,490 | Schuyler et al. | May 8, 1923 |
| 1,552,928 | Hershon | Sept. 8, 1925 |
| 1,667,351 | Levitt | Apr. 24, 1928 |
| 1,768,429 | Stoney | June 24, 1930 |
| 1,959,655 | Brouhard | May 22, 1934 |
| 2,225,273 | Jacobs | Dec. 17, 1940 |
| 2,351,355 | Merrett | June 13, 1944 |
| 2,403,582 | Caudill | July 9, 1946 |
| 2,448,414 | Branick | Aug. 31, 1948 |
| 2,473,571 | Cook | June 21, 1949 |

FOREIGN PATENTS

| Number | Country | Date |
|---|---|---|
| 396,071 | France | Jan. 15, 1909 |